United States Patent
Saito

(10) Patent No.: US 9,548,485 B2
(45) Date of Patent: Jan. 17, 2017

(54) VALVE REGULATED LEAD-ACID BATTERY

(75) Inventor: Kazuma Saito, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 336 days.

(21) Appl. No.: 14/114,630

(22) PCT Filed: Apr. 16, 2012

(86) PCT No.: PCT/JP2012/060213
§ 371 (c)(1),
(2), (4) Date: Oct. 29, 2013

(87) PCT Pub. No.: WO2012/150673
PCT Pub. Date: Nov. 8, 2012

(65) Prior Publication Data
US 2014/0087218 A1     Mar. 27, 2014

(30) Foreign Application Priority Data

May 2, 2011   (JP) ................................ 2011-103003

(51) Int. Cl.
| | |
|---|---|
| *H01M 10/08* | (2006.01) |
| *H01M 2/36* | (2006.01) |
| *H01M 10/12* | (2006.01) |
| *H01M 10/42* | (2006.01) |

(52) U.S. Cl.
CPC ............... *H01M 2/36* (2013.01); *H01M 10/08* (2013.01); *H01M 10/121* (2013.01); *H01M 10/4235* (2013.01); *H01M 2300/0011* (2013.01); *H01M 2300/0085* (2013.01); *Y02E 60/126* (2013.01)

(58) Field of Classification Search
CPC .................................................... H01M 10/08
USPC .......................................................... 429/72
See application file for complete search history.

(56) References Cited

U.S. PATENT DOCUMENTS

| | | | | |
|---|---|---|---|---|
| 6,218,052 | B1 * | 4/2001 | Wang | H01M 10/08 |
| | | | | 429/204 |
| 2008/0107960 | A1 | 5/2008 | Furukawa et al. | |
| 2008/0199769 | A1 | 8/2008 | Saito et al. | |

FOREIGN PATENT DOCUMENTS

| | | |
|---|---|---|
| CN | 1153310 | 6/2004 |
| CN | 101685884 | 3/2010 |
| CN | 101867066 A | 10/2010 |
| CN | 101882694 | 11/2010 |
| JP | 60-009065 | 1/1985 |
| JP | 01-128367 | 5/1989 |
| JP | 08-153535 | 6/1996 |
| JP | 11-135127 | 5/1999 |
| JP | 11-176449 | 7/1999 |
| JP | 2002-110219 | 4/2002 |

(Continued)

OTHER PUBLICATIONS

International Search Report dated Jul. 3, 2012 filed in PCT/JP2012/060213.

(Continued)

*Primary Examiner* — Basia Ridley
*Assistant Examiner* — James Erwin
(74) *Attorney, Agent, or Firm* — Rankin, Hill & Clark LLP

(57) ABSTRACT

A valve regulated lead-acid battery includes a positive electrode plate, a retainer mat and a negative electrode plate housed in a container and holding an electrolyte solution respectively. The electrolyte solution contains colloidal silica and lithium ions.

7 Claims, 1 Drawing Sheet

(56) References Cited

FOREIGN PATENT DOCUMENTS

| | | |
|---|---|---|
| JP | 2003-036831 | 2/2003 |
| JP | 2004-165070 | 6/2004 |
| JP | 2004-327348 | 11/2004 |
| JP | 2006-185743 | 7/2006 |
| JP | 2007-250308 | 9/2007 |
| JP | 2007-250495 | 9/2007 |
| JP | 2008-103180 | 5/2008 |
| JP | 2008-204638 | 9/2008 |
| JP | 2008-243487 | 10/2008 |
| JP | 2009-146829 | 7/2009 |
| JP | 2009-252435 | 10/2009 |
| JP | 2010-123351 | 6/2010 |
| JP | 2010-192162 | 9/2010 |
| JP | 2012-074279 | 4/2012 |
| WO | 2012/043331 | 4/2012 |

OTHER PUBLICATIONS

English translation of Chinese Office Action dated Aug. 18, 2015 issued in the corresponding Chinese patent application No. 201280020072.1.

Extended European Search Report dated Sep. 29, 2014 issued in the corresponding European patent application No. 12779390.9.

* cited by examiner

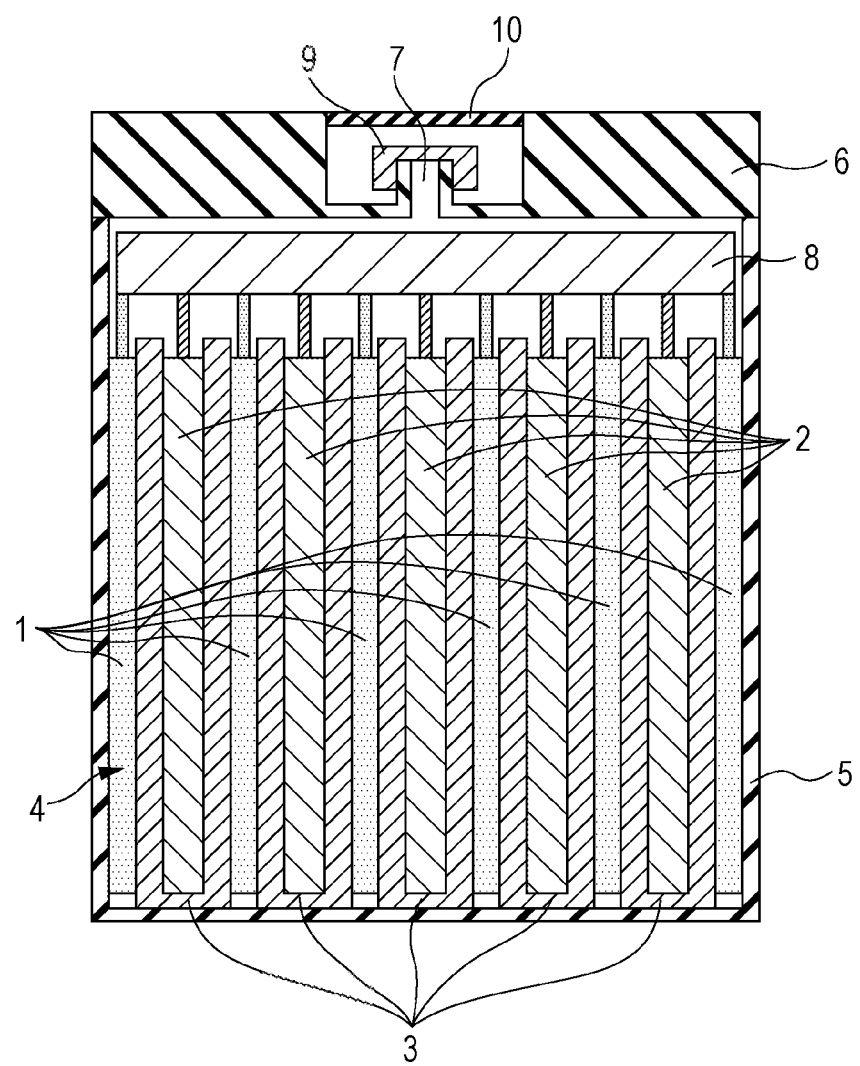

VALVE REGULATED LEAD-ACID BATTERY

FIELD

The present invention relates to a valve regulated lead-acid battery using a retainer mat.

BACKGROUND

A valve regulated lead-acid battery can be used in any posture since an electrolyte solution is gelated or is held by a porous body such as a retainer mat, and therefore the amount of a free electrolyte solution can be reduced. Further, it is unnecessary to resupply water since oxygen gas generated at a positive electrode during charge can be absorbed and reduced to water at a negative electrode, and therefore water in the electrolyte solution is hardly lost. On the other hand, in the valve regulated lead-acid battery, since the amount of the electrolyte solution is small, the concentration of sulfate ions in the electrolyte solution tends to decrease by discharge. When the concentration of sulfate ions in the electrolyte solution is decreased, the solubility of lead and lead sulfate in the electrode plate becomes high and lead and lead sulfate tend to be eluted in the electrolyte solution in the form of $Pb^{2+}$. When the lead-acid battery is charged after overdischarge, $Pb^{2+}$ eluted in the retainer mat is reduced to a dendritic metal lead, and therefore a short circuit may occur between the positive electrode plate and the negative electrode plate. This kind of short circuit is referred to as a penetration short circuit.

The present inventor et al. have proposed to add a silica sol to an electrolyte solution in order to prevent the penetration short circuit in a valve regulated lead-acid battery (Patent Document 1 JP-A-2008-204638). However, even though a silica sol is added singly, the effect of suppressing a short circuit after the valve regulated lead-acid battery is left in an overdischarge state is not sufficient (Table 1), and charge acceptance after the valve regulated lead-acid battery is left in an overdischarge state is not sufficient. Thus, it is necessary to further reduce the short circuit after the valve, regulated lead-acid battery is left in an overdischarge state, and to improve the charge acceptance after the valve regulated lead-acid battery is left in an overdischarge state.

In addition, Patent Document 2 (JP-A-2008-243487) discloses that the utilization factor of a positive electrode is improved when a liquid type lead-acid battery contains lithium ions. However, JP-A-2008-243487 does not describe a relation between the lithium ions and the penetration short circuit or charge acceptance after the lead-acid battery is left in an overdischarge state.

PRIOR ART DOCUMENTS

Patent Documents

Patent Document 1: JP-A-2008-204638
Patent Document 2: JP-A-2008-243487

SUMMARY OF THE INVENTION

Problems to be Solved by the Invention

An object of the present invention is to further reduce a short circuit and to improve charge acceptance after a valve regulated lead-acid battery if left in an overdischarge state.

Means for Solving the Problems

The present invention relates to a valve regulated lead-acid battery including a positive electrode plate, a retainer mat and a negative electrode plate housed in a container, the positive electrode plate, the retainer mat and the negative electrode plate respectively holding an electrolyte solution and the electrolyte solution containing colloidal silica, wherein the electrolyte solution contains lithium ions.

A silica content in the electrolyte solution is preferably 1% by mass or more. Also, the silica content in the electrolyte solution is preferably 5% by mass or less. The silica content in the electrolyte solution is particularly preferably 1% by mass or more and 5% by mass or less. A lithium-ion content in the electrolyte solution is preferably 0.02 mol/L or more. Also, the lithium-ion content in the electrolyte solution is preferably 0.4 mol/L or less. The lithium-ion content in the electrolyte solution is particularly preferably 0.02 mol/L or more and 0.4 mol/L or less.

As shown in Table 1, when the electrolyte solution contains colloidal silica, the short circuit after the valve regulated lead-acid battery is left, in an overdischarge state is reduced. In addition, hereinafter, the colloidal silica is merely referred to as silica. Further, the charge acceptance after the valve regulated lead-acid battery is left in an overdischarge state is not improved by silica. Herein, when the electrolyte solution contains lithium ions in addition to silica, the short circuit after the valve regulated lead-acid battery is left in an overdischarge state is further reduced, and the charge acceptance after the valve regulated lead-acid battery is left in an overdischarge state is also improved. However when the electrolyte solution contains sodium ion in Place of lithium ions, the charge acceptance specified by JIS (JIS D 5301: 2006 9.5.4b) is significantly deteriorated.

Experiments were carried out within a range of the silica content of from 0.5% by mass to 7% by mass, and the short circuit after the valve regulated lead-acid battery was left in an overdischarge state could be reduced at any content within this range. Further, when the silica content was 1% by mass or more, the short circuit incidence was significantly reduced. On the other hand, when the silica content was more than 5% by mass, the gelation of the electrolyte solution occurred and the charge acceptance was significantly deteriorated. Therefore, the silica content is preferably 1% by mass or more and 5% by mass or less. Experiments were carried out, within a range of the lithium ion content of 0.01 mol/L or more and 0.5 mol/L or less, and the short circuit after the valve regulated lead-acid battery was left in an overdischarge state could be reduced further at any content within this range. Herein, when the lithium ion content was set to 0.02 mol/L, or more, the short circuit after the valve regulated lead-acid battery was left in an overdischarge state could be adequately reduced, and the charge acceptance after the valve regulated lead-acid battery was left in an overdischarge state could be significantly improved. Moreover, when the lithium ion content was increased from 0.02 mol/L, the short circuit after the valve regulated lead-acid battery was left in an overdischarge state was not reduced, and an improvement in the charge acceptance after the valve regulated lead-acid battery was left in an overdischarge state was slight. On the other hand, when the electrolyte solution contained 0.5 mol/L lithium ions, the charge acceptance specified by JIS was significantly deteriorated. Therefore, the lithium-ion content is preferably 0.02 mol/L or more and 0.4 mol/L or less. When the silica content in the electrolyte solution is set to 1% by mass or more and 5% by mass or less and the lithium-ion content in the electrolyte solution is set to 0.02 mol/L or more and 0.4 mol/L or less, there are few problems in association with the gelation of the electrolyte solution, the short circuit after the valve regulated lead-acid battery is left in an overdischarge state is adequately few, the charge acceptance after the valve regulated lead-acid battery is left in an overdischarge state is high, and the charge acceptance specified by JIS is not largely deteriorated.

BRIEF DESCRIPTION OF THE DRAWING

FIG. 1 is a sectional view of a valve regulated lead-acid battery according to Example.

MODE FOR CARRYING OUT THE INVENTION

Hereinafter, optimum Examples of the present invention will be described. For carrying out the present invention. Examples can be appropriately modified according to common knowledge of those skilled in the art and disclosure of the prior art.

Examples

An expanded type negative electrode grid composed of a Pb—Ca—Sn-based alloy was filled with a negative active material obtained by forming a lead powder into a paste with dilute sulfuric, acid according to a usual method, to form a negative electrode plate. Also, an expanded type positive electrode grid composed of a Pb—Ca—Sn-based alloy was filled with a positive active material obtained by forming a lead powder into a paste with dilute sulfuric acid according to a usual method, to form a positive electrode plate. The positive electrode plate was sandwiched by a U-shaped retainer mat (1.5 mm in thickness) mainly made of glass fibers or a leaf-like retainer mat was sandwiched between the positive electrode plate and the negative electrode plate, so that the retainer mat was interposed between the positive electrode plate and the negative electrode plate. An element constituted of five positive electrode plates and six negative electrode plates was prepared, and six elements were housed in series in a container. An electrolyte solution containing dilute sulfuric acid having a specific gravity of 1.220 g/cm$^3$, a predetermined amount of colloidal silica and a predetermined amount of lithium ions was poured into the container by an amount such that a free electrolyte solution disappeared in a charged battery. Then, the elements were subjected to formation in a container such that the elements were charged at an electrical quantity of 220% of a theoretical capacity of the positive electrode at 30° C. A vent valve was disposed at an injection port located at an intermediate, lid of the container. A top lid was attached thereto to prepare a valve regulated lead-acid battery.

SNOWTEX (registered trademark) 20 produced by Nissan chemical Industries Co., Ltd. wad used as the colloidal silica. Colloidal silica in SNOWTEX 20 is stabilized with sodium ions and has a pH of 9.5 to 10. Silica has an average particle size of 10 to 20 nm and a concentration of 20% by mass, and the dispersion medium of the silica is water. Since the average particle size of the silica varies with pH, the average particle size exhibits varying values in the electrolyte solution. The particle size of silica as a starting material, a kind of ion used in stabilization and the like are arbitrary, and for example, acid type colloidal silica which does not contain sodium ions as a stabilizing agent may be used. The lithium ions were added as lithium carbonate, but any form of lithium can be used at the time of addition. As the retainer mat, not only a retainer mat mainly made of glass fibers, but also a retainer mat mainly made of synthesized fibers may be used. The composition of the positive active material and that of the negative active material, the composition and method of production of the positive electrode grid and those of the negative electrode grid, conditions of the formation in a container and the like are arbitrary.

FIG. 1 shows a structure of the valve regulated lead-acid battery, and 1 denotes a negative electrode plate, 2 denotes a positive electrode plate, a retainer mat 3 separates the negative electrode plate 1 and the positive electrode plate 2 next to each other, and the negative electrode plate 1, the positive electrode plate 2 and the retainer mat 3 constitute an element 4. A container 5 is made of, for example, polypropylene, 6 denotes an intermediate lid and 7 denotes an injection port of electrolyte solution. Further, 8 denotes a strap of the element, 9 denotes a vent valve and 10 denotes a top lid.

Valve regulated lead-acid batteries A1 to A29 were prepared by varying the silica concentration in a range of 0% by mass to 7% by mass, and the lithium ion concentration in a range of 0% by mass to 0.5% by mass. The sample A1 is a sample of Comparative Example which does not contain silica nor lithium ions, and the sample A29 is a sample of Comparative Example which does not contain, silica. A valve regulated lead-acid battery, which contains 3% by mass of silica and 0.2 mol/L sodium ions but does not contain lithium ions, is prepared as a sample C1 for comparison. A sample D1 for comparison is a valve regulated lead-acid battery containing silica and potassium ions. A sample C2 for comparison is a valve regulated lead-acid battery not containing silica but containing sodium ions, and a sample D2 is a valve regulated lead-acid battery not containing silica but containing potassium ions.

The charge acceptance specified by JIS was tested according to JIS D 5301: 2006 9.5.4b. In order to allow valve regulated lead-acid batteries to undergo a state of being left in an overdischarge state, each valve regulated lead-acid battery was discharged at is 20 hour current rate in an atmosphere of 25° C. until a voltage reached 6.0 V, and then the lead-acid battery was shorted between terminals with a resistance of 10Ω and left for 30 days in an atmosphere of 40° C. Next, the charge acceptance after each valve regulated lead-acid battery was left in an overdischarge state was measured in the same charging conditions as in the test method according to JIS D 5301: 2006 9.5.4b. The charge acceptance was measured after each valve regulated lead-acid battery was left in an overdischarge state. The valve regulated lead-acid battery was charged at a 10 hour current rate for 20 hours in an atmosphere of 25° C., and then the lead-acid battery was disassembled. The retainer mat was sliced in half in the direction of thickness, and the number of traces of short circuit on an inner surface (sliced surface) of the retainer mat was counted. The charge acceptance indicates an average value determined from three lead-acid batteries for each case, and the short circuit incidence was determined from all retainer mats used in one lead-acid battery for each case. The results are shown in Table 1. The charge acceptance and the short circuit incidence in Table 1 are relative values at the time of assuming values of the sample A1 to be 100. Practically, it is preferred that the charge acceptance specified by JIS is 90 or more, the charge acceptance after the lead-acid battery is left in an overdischarge state is 140 or more, and the short circuit after the lead-acid battery is left in an overdischarge state is 10 or less.

TABLE 1

Examples

| | Silica Concentration (% by mass) | Lithium Ion (mol/L) | Sodium Ion (mol/L) | Potassium Ion (mol/L) | Charge Acceptance[*1] JIS[*2] | Charge Acceptance[*1] After lead-acid battery is left in overdischarge state[*2] | Short Circuit Incidence[*1] After lead-acid battery is left in overdischarge state[*2] |
|---|---|---|---|---|---|---|---|
| A1 | 0 | 0 | 0 | 0 | 100 | 100 | 100 |
| A2 | 0.5 | 0.4 | 0 | 0 | 100 | 163 | 70 |
| A3 | 1 | 0 | 0 | 0 | 100 | 100 | 20 |
| A4 | | 0.01 | 0 | 0 | 100 | 105 | 15 |
| A5 | | 0.02 | 0 | 0 | 99 | 150 | 10 |
| A6 | | 0.1 | 0 | 0 | 98 | 155 | 10 |
| A7 | | 0.2 | 0 | 0 | 97 | 160 | 10 |
| A8 | | 0.3 | 0 | 0 | 96 | 165 | 10 |
| A9 | | 0.4 | 0 | 0 | 94 | 165 | 10 |
| A10 | | 0.5 | 0 | 0 | 85 | 165 | 10 |
| A11 | 3 | 0 | 0 | 0 | 98 | 100 | 20 |
| A12 | | 0.01 | 0 | 0 | 98 | 103 | 15 |
| A13 | | 0.02 | 0 | 0 | 97 | 147 | 10 |
| A14 | | 0.1 | 0 | 0 | 96 | 152 | 10 |
| A15 | | 0.2 | 0 | 0 | 95 | 157 | 10 |
| A16 | | 0.3 | 0 | 0 | 94 | 162 | 10 |
| A17 | | 0.4 | 0 | 0 | 92 | 162 | 10 |
| A18 | | 0.5 | 0 | 0 | 83 | 162 | 10 |
| A19 | 5 | 0 | 0 | 0 | 96 | 100 | 20 |
| A20 | | 0.01 | 0 | 0 | 96 | 101 | 15 |
| A21 | | 0.02 | 0 | 0 | 95 | 144 | 10 |
| A22 | | 0.1 | 0 | 0 | 94 | 149 | 10 |
| A23 | | 0.2 | 0 | 0 | 93 | 154 | 10 |
| A24 | | 0.3 | 0 | 0 | 92 | 158 | 10 |
| A25 | | 0.4 | 0 | 0 | 90 | 158 | 10 |
| A26 | | 0.5 | 0 | 0 | 82 | 158 | 10 |
| A27 | 7 | 0.02 | 0 | 0 | 85 | 115 | 10 |
| A28 | | 0.4 | 0 | 0 | 81 | 135 | 10 |
| C1[*3] | 3 | 0 | 0.2 | 0 | 83 | 157 | 10 |
| D1[*3] | | 0 | 0 | 0.2 | 78 | 155 | 10 |
| A29 | 0 | 0.2 | 0 | 0 | 97 | 162 | 70 |
| C2[*3] | | 0 | 0.2 | 0 | 85 | 162 | 70 |
| D2[*3] | | 0 | 0 | 0.2 | 80 | 160 | 70 |

[*1]The charge acceptance and the short circuit incidence are rations at the time of assuming values of the battery (A1) not containing silica and lithium ions to be 100.
[*2]Targets of test items are set to charge acceptance by JIS ≥ 90, charge acceptance after a lead-acid battery is left in an overdischarge state ≥140, and short circuit incidence after a lead-acid battery is left in an overdischarge state ≤10.
[*3]Comparative Examples containing sodium ions and potassium ions in place of lithium ions The effect of containing silica alone was limited to suppression of short circuit, and the effect of improving the charge acceptance was not found in both of the test specified by JIS and the test after the lead-acid battery was left in an overdischarge state. Further, when the electrolyte solution contained silica alone, the short circuit incidence could not be suppressed below 20 even though the content of silica was increased from 1% by mass to 5% by mass. In contrast, when the electrolyte solution contained silica and lithium ions, the short circuit incidence after the lead-acid battery was left in an overdischarge state was reduced to about 10 to 15, which are one-half to three-quarters of the case of containing silica alone, and further the charge acceptance after the lead-acid battery was left in an overdischarge state was improved. When the lithium ion concentration was set to 0.02 mol/L or more, the charge acceptance after the lead-acid battery was left in an overdischarge state was significantly improved, and the short circuit incidence after the lead-acid battery was left in an overdischarge state was also reduced to 10, which is one-half of the case of not containing lithium ions.

When the silica concentration was set to 7% by mass, the charge acceptance specified by JIS was deteriorated since the electrolyte solution was gelated. In contrast, when the silica concentration was 5% by mass or less, the gelation of the electrolyte solution did not occur and deterioration in the charge acceptance specified by JIS was within an allowable range. Even when the lithium ion concentration was increased from 0.3 mol/L, a positive effect of suppressing the occurrence of short circuit and improving the charge acceptance after the lead-acid battery was left in an over state was saturated at 0.3 mol/L or more, and when the lithium ion concentration was increased to 0.5 mol/L, the charge acceptance specified by JIS was deteriorated. Accordingly, the lithium ion concentration is preferably 0.4 mol/L or less. When the electrolyte solution contained sodium ions (sample C1) in place of lithium ions (sample A15), the charge acceptance specified by JIS was significantly deteriorated although the short circuit incidence and charge acceptance after the lead-acid battery was left in an overdischarge state were not different from those in the case of lithium ions. Further, when the electrolyte solution contained potassium ions (sample D1) in place of lithium ions (sample A15), the charge acceptance specified by JIS was further deteriorated.

The charge acceptance from SOC (state of charge) of 90% was measured under conditions where the presence or absence of silica and kinds of alkali metal ions were varied.

Each lead-acid battery was discharged at a 5 hour current rate (5 hR current) for 0.5 hours from a state of full charge to reach SOC of 90%, and the battery rested (left standing) overnight at 25° C. Then, the cumulative electrical quantity, which could be charged in 10 seconds at a maximum current of 100 A at a constant voltage of 14.0 V, was measured. Taking the cumulative electrical quantity of the sample A1 a 100%, a relative value of the cumulative electrical quantity of each sample to the sample A1 is shown in Table 2, and this performance is referred to as regenerative charge acceptance.

TABLE 2

Example 2

| | Silica Content (% by mass) | Lithium Ion (mol/L) | Sodium Ion (mol/L) | Potassium Ion (mol/L) | Regenerative Charge Acceptance*[4] |
|---|---|---|---|---|---|
| A1 | 0 | 0 | 0 | 0 | 100 |
| A29 | 0 | 0.2 | 0 | 0 | 100 |
| C2 | 0 | 0 | 0.2 | 0 | 80 |
| D2 | 0 | 0 | 0 | 0.2 | 70 |
| A15 | 3 | 0.2 | 0 | 0 | 95 |
| C1 | 0 | 0 | 0.2 | 0 | 65 |
| D1 | 0 | 0 | 0 | 0.2 | 50 |

*[4] A relative value of the cumulative electrical quanity (Asec) charged in 10 seconds at a maximum current of 100 A at a CV (constant voltage) of 14.0 V in SOC of 90% (discharged at a 5 hR current for 0.5 hours from a fully charged state and rested overnight at 25° C.) when taking the cumulative electrical quantity of the sample A1 as 100.

When lithium ions were used, the regenerative charge acceptance was higher than that of the case where sodium ions and potassium ions were used. Particularly, when the electrolyte solution contained alkali metal ions and silica, the regenerative charge acceptance was within an allowable range for the case of using lithium ions, but it was extremely low for the case of using sodium ions and potassium ions.

In Examples, the charge acceptance after the lead-acid battery is left in an overdischarge state is improved and the short circuit is suppressed, and the charge acceptance specified by JIS and the regenerative charge acceptance can also be maintained within an allowable range by synergistic interaction between silica, and lithium ions in the valve regulated lead-acid batteries each using a retainer mat.

DESCRIPTION OF REFERENCE SIGNS

1 negative electrode plate
2 positive electrode plate
3 retainer mat
4 element
5 container
6 intermediate lid
7 injection port
8 negative electrode strap
9 vent valve
10 top lid

What is claimed is:

1. A valve regulated lead-acid battery comprising a positive electrode plate, a retainer mat and a negative electrode plate, which are housed in a container and holding an electrolyte solution respectively, and the electrolyte solution containing colloidal silica, wherein
   the electrolyte solution contains lithium ions,
   a silica content in the electrolyte solution is 1% by mass or more and 5% by mass or less, and
   a lithium-ion content in the electrolyte solution is 0.02 mol/L or more.

2. The valve regulated lead-acid battery according to claim 1, wherein the lithium-ion content in the electrolyte solution is 0.02 mol/L or more and 0.4 mol/L or less.

3. The valve regulated lead-acid battery according to claim 1, wherein the electrolyte solution is not gelated.

4. The valve regulated lead-acid battery according to claim 1, wherein the negative electrode plate comprises a negative electrode grid comprising a Pb—Ca—Sn-based alloy.

5. The valve regulated lead-acid battery according to claim 1, wherein the colloidal silica has an average particle size of 10 to 20 nm.

6. The valve regulated lead-acid battery according to claim 1, wherein the retainer mat comprises glass fibers or synthesized fibers.

7. The valve regulated lead-acid battery according to claim 1, wherein the lithium-ion content in the electrolyte solution is 0.02 mol/L or more and 0.5 mol/L or less.

* * * * *